US008186285B2

(12) United States Patent
Fitts, Jr.

(10) Patent No.: US 8,186,285 B2
(45) Date of Patent: May 29, 2012

(54) SLIDER ASSEMBLY FOR ATM

(75) Inventor: Steven Fitts, Jr., Columbia, SC (US)

(73) Assignee: The Fitts Company, Inc., Lexington, SC (US)

( * ) Notice: Subject to any disclaimer, the term of this patent is extended or adjusted under 35 U.S.C. 154(b) by 1133 days.

(21) Appl. No.: 12/035,849

(22) Filed: Feb. 22, 2008

(65) Prior Publication Data

US 2008/0202392 A1   Aug. 28, 2008

Related U.S. Application Data

(60) Provisional application No. 60/891,180, filed on Feb. 22, 2007.

(51) Int. Cl.
*E05G 1/00* (2006.01)
*G07G 5/00* (2006.01)
(52) U.S. Cl. ...... 109/24.1; 109/47; 248/188.1; 248/678; 312/334.32; 902/30
(58) Field of Classification Search ............. 109/24.1, 109/45, 47, 49; 414/267, 280; 52/29, 67; 248/678, 188.1, 346.01; 312/331, 334.13, 312/334.27, 334.31, 334.32, 334.36, 334.39; 902/30–35
See application file for complete search history.

(56) References Cited

U.S. PATENT DOCUMENTS

| 2,140,418 A | 12/1938 | Dilts |
| 3,028,209 A | 4/1962 | Hinkel et al. |
| 3,797,880 A * | 3/1974 | Pezzaglia ............... 296/26.13 |
| 4,399,755 A | 8/1983 | Wiedmann |
| 4,482,066 A | 11/1984 | Dykstra |
| 4,497,261 A | 2/1985 | Ferris et al. |
| 4,513,670 A | 4/1985 | Berman |
| 4,557,352 A | 12/1985 | Tschappat, Jr. |
| 4,558,650 A | 12/1985 | Berman |
| 4,577,562 A | 3/1986 | Berman |
| 4,603,643 A | 8/1986 | Couvrette |
| 4,649,832 A | 3/1987 | Hain et al. |
| 4,681,044 A * | 7/1987 | Dallman ............... 109/24.1 |
| 4,720,154 A | 1/1988 | Seiter |

(Continued)

FOREIGN PATENT DOCUMENTS

JP       350694       3/1991

(Continued)

OTHER PUBLICATIONS

Reliable Construction Co., North Carolina, photographs, 1 page, 6 photographs of ATM sliding mechanism, admitted as prior art.

*Primary Examiner* — Lloyd Gall
(74) *Attorney, Agent, or Firm* — Senniger Powers LLP

(57) ABSTRACT

A slider assembly for moving an ATM into and out of an ATM housing comprises a driving mechanism and a mount. Vertically spaced apart upper and lower bearing structures extending outward from the mount partially define a horizontal channel. A platform for supporting the ATM has a front end, a rear end and opposite first and second side margins. The platform is operatively connected to the driving mechanism to impart generally linear forward and rearward movements of the platform relative to the mounts between extended and retracted positions. The first side margin of the platform is received within the horizontal channel between the upper and lower bearing structures to support the platform and to facilitate the linear movement of the platform by the driving mechanism.

24 Claims, 11 Drawing Sheets

U.S. PATENT DOCUMENTS

| | | |
|---|---|---|
| 4,813,475 A | 3/1989 | Couvrette |
| 4,856,437 A | 8/1989 | Trucksess |
| 5,036,779 A | 8/1991 | Capraro |
| 5,052,878 A | 10/1991 | Brockhaus |
| 5,215,363 A | 6/1993 | Warwick, III |
| 5,299,511 A | 4/1994 | Dallman et al. |
| 5,362,144 A | 11/1994 | Shioya et al. |
| 5,379,704 A | 1/1995 | Couvrette |
| 5,440,999 A | 8/1995 | Dallman et al. |
| 5,611,288 A | 3/1997 | Dallman et al. |
| 5,615,623 A | 4/1997 | Capraro, Jr. |
| 5,711,231 A | 1/1998 | Couvrette et al. |
| 5,794,547 A | 8/1998 | Dallman et al. |
| 5,806,439 A | 9/1998 | Fitts, Sr. |
| 5,836,256 A | 11/1998 | Senterfeit, Sr. |
| 6,000,806 A | 12/1999 | Dallman |
| 6,036,089 A | 3/2000 | Oguchi et al. |
| 6,422,158 B1 | 7/2002 | Fitts, Sr. et al. |
| 6,457,277 B1 | 10/2002 | Meyers |
| 7,997,668 B2 * | 8/2011 | Lee ................................ 312/402 |
| 2001/0035704 A1 * | 11/2001 | Dierbeck ....................... 312/902 |
| 2003/0213185 A1 * | 11/2003 | Findley ............................. 52/67 |
| 2004/0055344 A1 * | 3/2004 | Bullock et al. .................. 70/212 |
| 2006/0250059 A1 * | 11/2006 | Lemm ........................... 312/331 |

FOREIGN PATENT DOCUMENTS

| | | |
|---|---|---|
| JP | 8124000 | 5/1996 |

* cited by examiner

SLIDER ASSEMBLY FOR ATM

BACKGROUND

Automatic Teller Machines (ATMs) may be housed within large structures called ATM buildings or housings. The ATM rests on a sliding assembly (generally referred to as a "slider" in the art) in the building. The slider allows the ATM to be moved between a retracted position, in which the ATM is inside the ATM building, and an extended position, in which the ATM is extended out of the building so that it can be serviced.

SUMMARY

In one aspect, a slider assembly for moving an ATM into and out of an ATM housing generally comprises a driving mechanism and a mount. Vertically spaced apart upper and lower bearing structures extend outward from the mount to partially define a horizontal channel. A platform for supporting the ATM has a front end, a rear end and opposite first and second side margins. The platform is operatively connected to the driving mechanism to impart generally linear forward and rearward movements of the platform relative to the mounts between extended and retracted positions. The first side margin is received within the horizontal channel between the upper and lower bearing structures to support the platform and to facilitate the linear movement of the platform by the driving mechanism.

In another aspect, a slider assembly for moving an ATM into and out of an ATM housing generally comprises a driving mechanism and a mount. A platform for supporting the ATM has front and rear margins and opposite side margins. The platform is operatively connected to the driving mechanism to impart generally linear movement of the platform between an extended position and a retracted position. The platform is mounted on the mount so that when the platform is in its extended position, the rear end margin is supported by the mount and the front end margin is cantilevered, and when the platform is in its retracted position, the front end margin is supported by the mount and the rear end margin is cantilevered.

In yet another aspect, a method of moving an ATM into and out of an ATM housing for servicing generally comprises supporting the ATM on a platform having a front end margin and a rear end margin. The front end margin of the platform is supported in a retracted position of the platform generally adjacent to a front wall of the ATM housing so that the rear end margin of the platform is cantilevered inside the ATM housing. The platform is linearly moved through an opening in the front wall of the ATM housing. The rear end margin of the platform is supported in an extended position of the platform generally adjacent to the front wall of the ATM housing so that the front end margin of the platform is cantilevered outside the ATM housing.

BRIEF DESCRIPTION OF THE DRAWINGS

Corresponding reference characters indicate corresponding parts throughout the drawings.

DETAILED DESCRIPTION OF THE DRAWINGS

Figure 1:
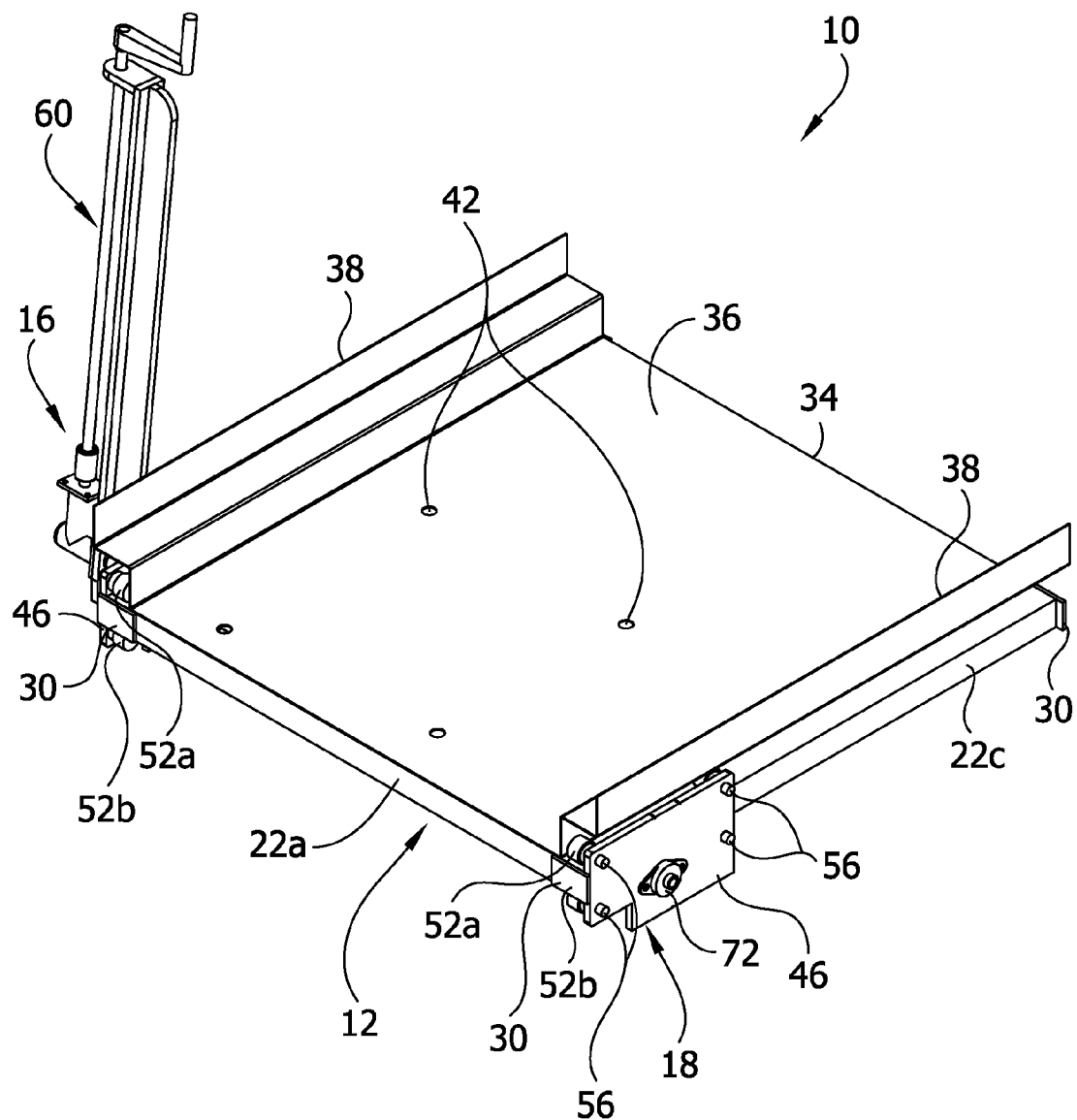
FIG. 1 is a perspective of a slider assembly.
Figure 6:
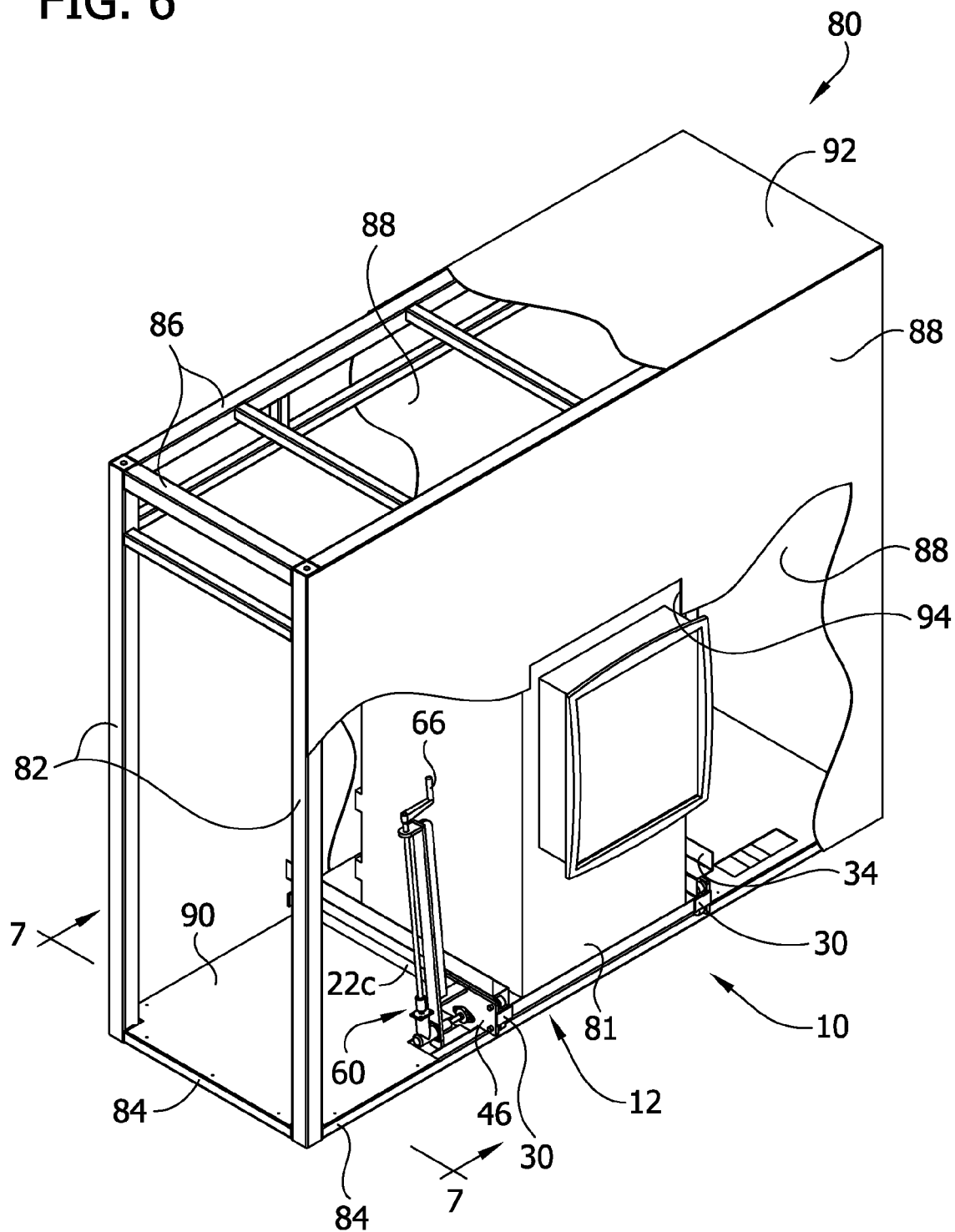
FIG. 6 is a perspective of an ATM housing with parts broken away to show the slider assembly, the platform of the slider assembly being in a retracted position.

Referring to FIGS. 1 and 6, one embodiment of a slider assembly for moving an automatic teller machine (ATM) into and out of an ATM housing is generally indicated at 10. The slider assembly 10 includes a platform, generally indicated at 12, for supporting an ATM thereon. A driving mechanism, generally indicated at 16, linearly moves the platform 12 and the ATM out of the ATM housing (e.g., forward) and back into the ATM housing (e.g., rearward). A support base, generally indicated at 18, supports the platform 12 and the ATM and facilitates the linear movement of the platform.

Figure 4:
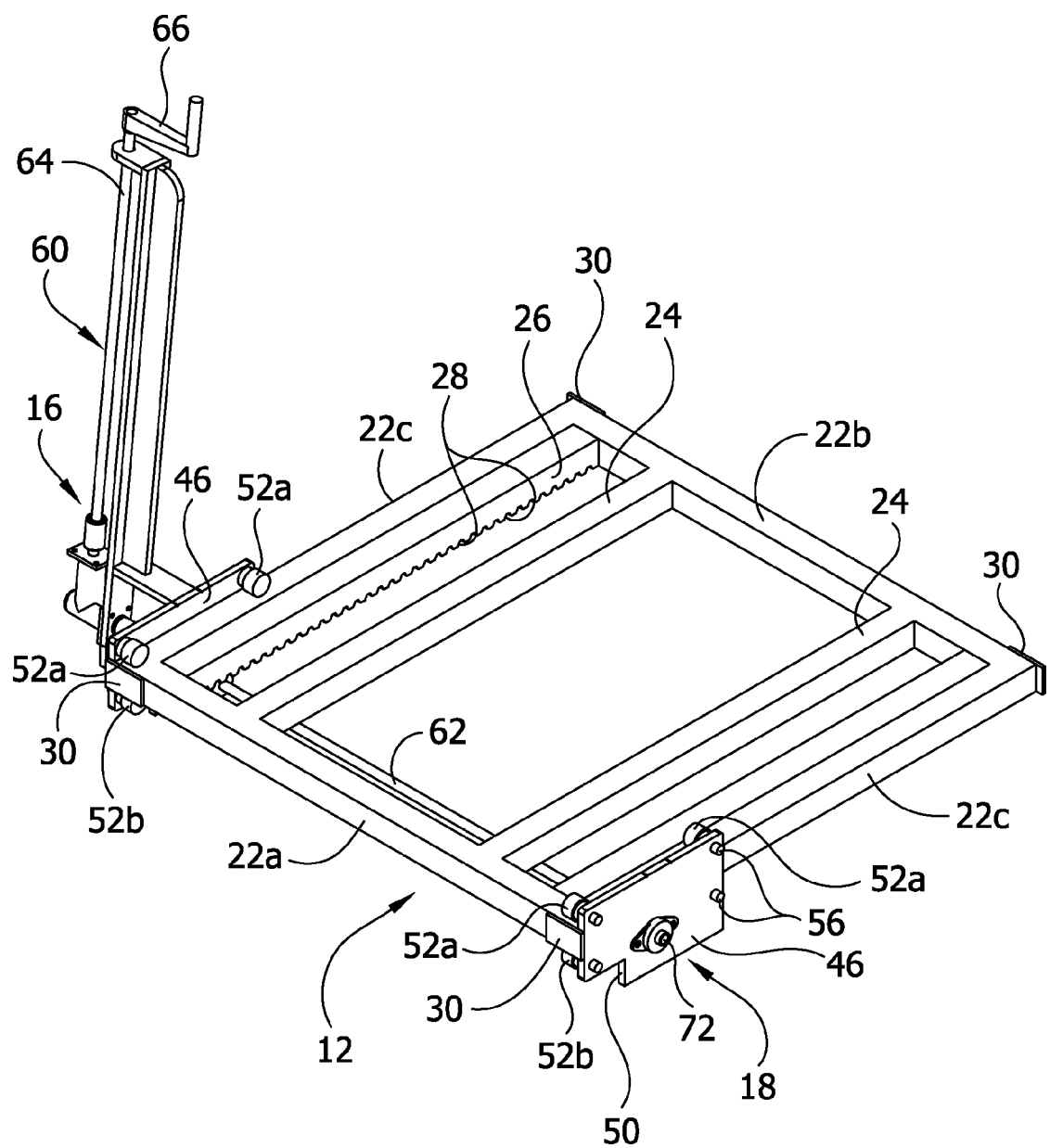
FIG. 4 is a perspective of a base of FIG. 2 with a platform of the slider assembly engaged with the base.
Figure 5:
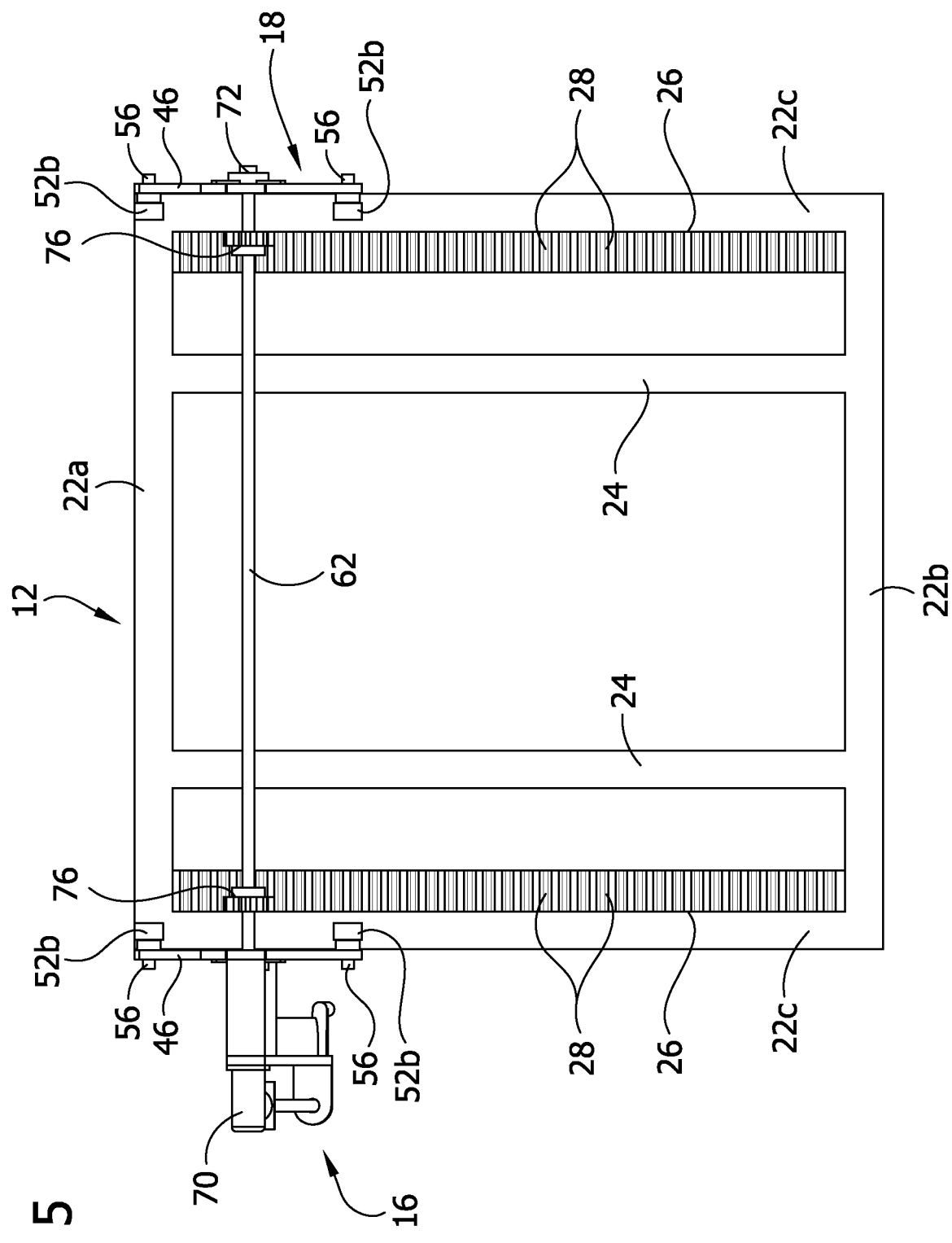
FIG. 5 is a bottom view of FIG. 4.

Referring additionally to FIGS. 4 and 5, the platform 12 on which the ATM 14 is supported has a generally rectangular perimeter and top and bottom surfaces. The platform includes front, rear and opposite side frame members 22a, 22b, 22c, respectively, defining a front end, a rear end and opposite side margins, respectively. Interior web members 24 secured to and extending between the front and rear frame members 22a, 22b provide additional structural support to the platform 12. Each of the frame members 22a, 22b, 22c and web members 24 has a generally rectangular cross section and may be formed from a generally rigid metal, such as steel bar stock. Elongate racks 26 are secured to the platform 12. The racks 26 extend between the front and rear ends of the platform 12 and are generally adjacent to the respective opposite side margins of the platform 12. The racks 26 include teeth 28 spaced along the lengths of the racks generally adjacent to the bottom surface of the platform 12. For reasons given below, stops 30 secured to the front and rear frame members 22a, 22b adjacent to the opposite side frames 22c extend laterally outward from the platform 12 beyond the respective side frame members.

Referring back to FIG. 1, in the illustrated embodiment a tray 34 is secured to the top surface of the platform 12. The tray 34 includes a floor 36 and a pair of opposite side walls 38 projecting upward from opposite sides of the floor. For reasons given below, each of the side walls 38 is generally z-shaped having a first portion extending upward from the floor 36 of the tray 34, a second portion extending laterally outward from the first portion, and a third portion extending upward from the second portion. Openings 42 extending through the floor 36 of the tray 34 receive fasteners (not shown) for securing the ATM to the tray 34. The tray may be welded to the platform 12 or secured in other ways. The tray 34 may be manufactured from sheet metal or other material within the scope of the invention.

Referring to FIGS. 1-5, the support base 18 includes opposing, spaced apart mounting plates 46 (broadly, mounts) on which the platform 12 is mounted. It is understood that the other structures, besides plates, may be used to mount the platform. As shown best in FIGS. 2 and 3, the plates 46 have inner faces generally facing one another and opposite front and rear ends. For reasons given below, each plate has a cutout 50 (see, FIGS. 2 and 4) extending upward from a bottom surface 48 of the plate at the front end of the plate.

Referring still to FIGS. 1-5, two upper rollers 52a (broadly, upper bearing structures) and two lower rollers 52b (broadly, lower bearing structures) are rotatably mounted on each mounting plate 46. The upper rollers 52a are spaced vertically from the lower rollers 52b on each plate 46. Moreover, the upper rollers 52a on each plate 46 are horizontally spaced apart from one another along the inner face of the plate, and likewise, the lower rollers 52b are horizontally spaced apart from one another. Through this arrangement, the four rollers 52a, 52b (i.e., the two upper rollers and the two lower rollers) define an elongate, "effective" horizontal channel, generally indicated at 54 (FIGS. 2 and 3), on each mounting plate 46 extending between the respective horizontally spaced rollers. Each effective horizontal channel extends from the corresponding upper and lower rollers 52a, 52b adjacent to the front end of the plate 46 to the corresponding upper and lower rollers 52a, 52b adjacent to the rear end of the plate. As explained in more detail below and as shown in FIGS. 1, 4 and 5, the side margins of the platform 12 (e.g., the side frame members 22c) are received in the effective horizontal channels 54, between the upper rollers 52a and the lower rollers 52b on the respective mounting plates 46.

In the illustrated embodiment, each roller 52a, 52b is rotatably mounted on a pin 56 (FIG. 3) that is fixedly secured to the respective mounting plates 46 and that extends horizontally inward from the inner face of the plate toward the opposite mounting plate. It is understood that other ways of rotatably mounting the rollers 52a, 52b on the mounting plates 46 are within the scope of the present invention. Each roller 52a, 52b continuously contacts the platform 12 as the platform is moved between its retracted and extended positions to reduce or eliminate vertical canting or pitching of the platform between the upper and lower rollers. In this way, the platform 12 remains substantially in the same horizontal plane (e.g., substantially level) as it is moved from its extended position to its retracted position, and vice versa. Vertical canting or pitching of the platform 12 between the upper and lower rollers 52a, 52b may produce unwanted forces that make it more difficult for the platform to be moved linearly into and out of the ATM housing. In the illustrated embodiment the space between the upper and lower rollers 52a, 52b is such that both of the rollers contact the respective upper and lower surfaces of the platform 12 in both the extended and retracted positions. Moreover, as the platform 12 is being moved, the rollers 52a, 52b rotate about the pins 56 to further facilitate linear movement of the platform. By rotating on the platform 12, the rollers 52a, 52b reduce frictional forces between the platform and the rollers that would otherwise hamper linear movement of the platform.

It is understood that other ways of defining a horizontal channel 54, including an effective horizontal channel, on the mounting plates 46 for receiving opposite side margins of the platform 12 are within the scope of the present invention. For example, each mounting plate 46 may include one upper roller and one lower roller defining a horizontal channel. Moreover, it is understood that each mounting plate 46 may include more than two upper rollers 52a and/or more than two lower rollers 52b defining the effective horizontal channel 54. Furthermore, it is also understood that non-rotatable bearing structures may be used in place of the rollers. Other configurations to define upper and lower bearing structures are within the scope of the present invention.

Figure 2:
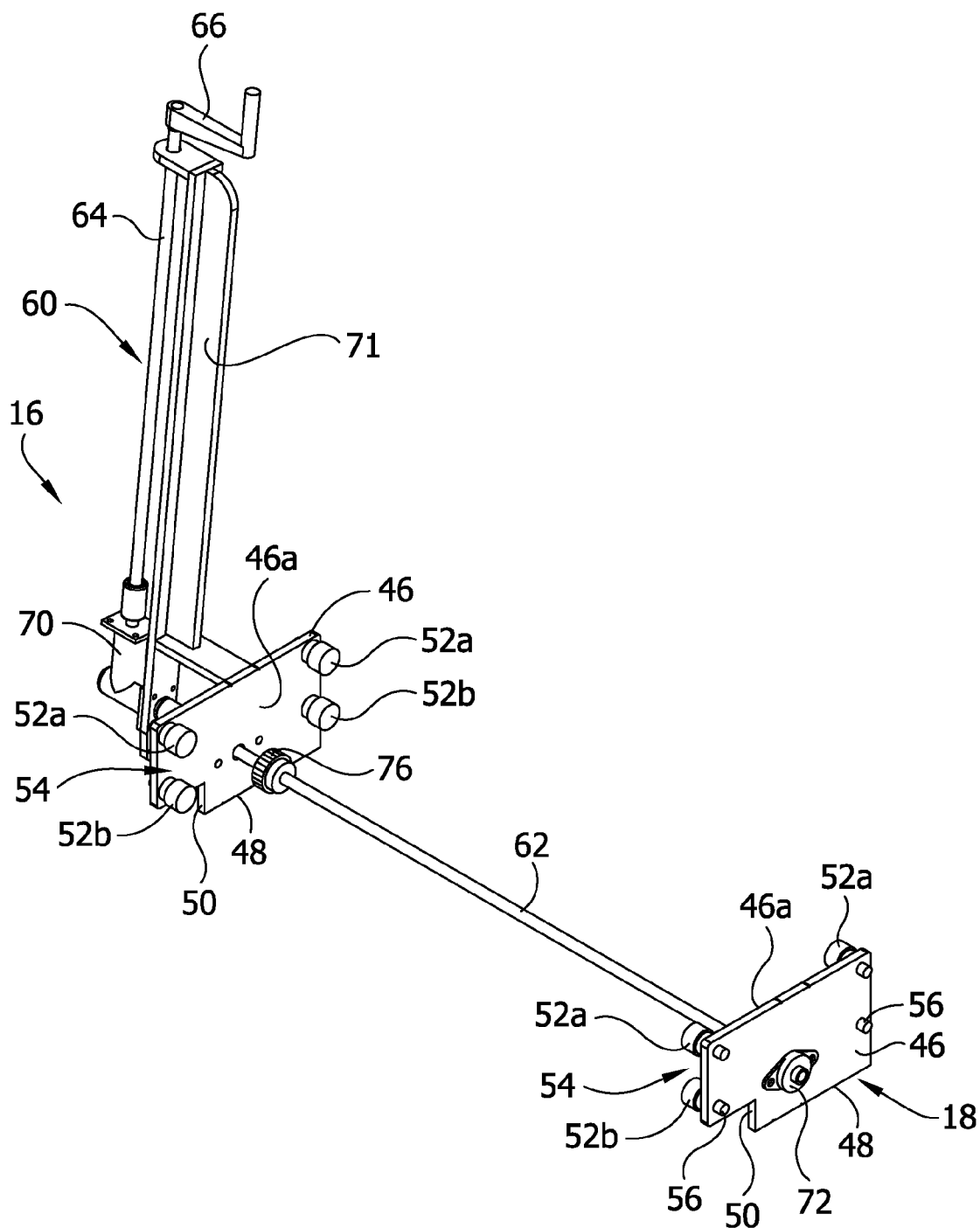
FIG. 2 is a perspective of a base of the slider assembly.
Figure 3:
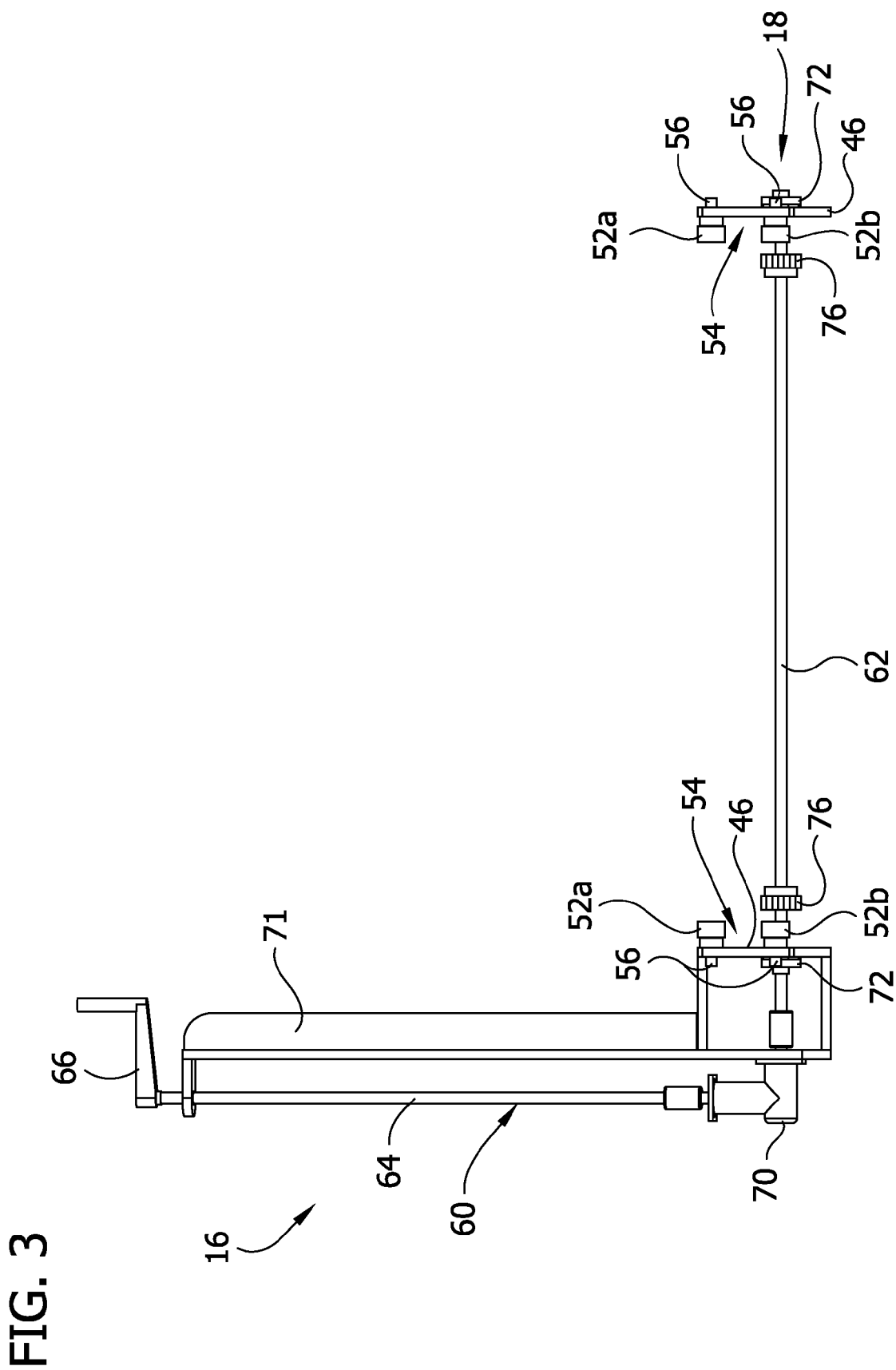
FIG. 3 is a front elevation of the base of FIG. 2.

In the illustrated embodiment, the driving mechanism 16 of the slider assembly 10 includes a hand crank, generally indicated at 60, and a shaft 62 operatively connected to the hand crank. As indicated in FIGS. 2-4, the hand crank 60 includes a generally vertical rod 64 having an upper end operatively connected to a lever handle 66 and a lower end operatively connected to an input gear (not shown) of a right angle bevel gear box 70. The rod 64 is supported at its upper end by a vertical support bracket 71 that is secured to the adjacent mounting plate 46. The shaft 62 of the driving mechanism 16 is operatively connected to an output gear (not shown) of the gear box 70 and extends horizontally below the platform 12 between the mounting plates 46. The shaft 62 is rotatably secured to the mounting plates by respective bearings 72. Spaced apart pinion gears 76 coaxially secured along the shaft 62 adjacent to respective mounting plates 46 engage the teeth 28 of the respective racks 26 on the bottom surface of the platform 12 (FIG. 5). Axial rotation of the vertical rod 64 using the crank handle 66 imparts axial rotation of the horizontal shaft 62 and the pinion gears 76 on the shaft to impart linear, forward and rearward movement of the platform 12 relative to the mounting plates 46. It is understood that other ways of driving forward and rearward movement of the platform 12 are within the scope of the present invention. For example, a motor may be used in place of the hand crank 60. Moreover, one pinion gear 76 instead of two may be used and the shaft 62 may not extend fully between the two mounting plates 46.

Figure 5A:
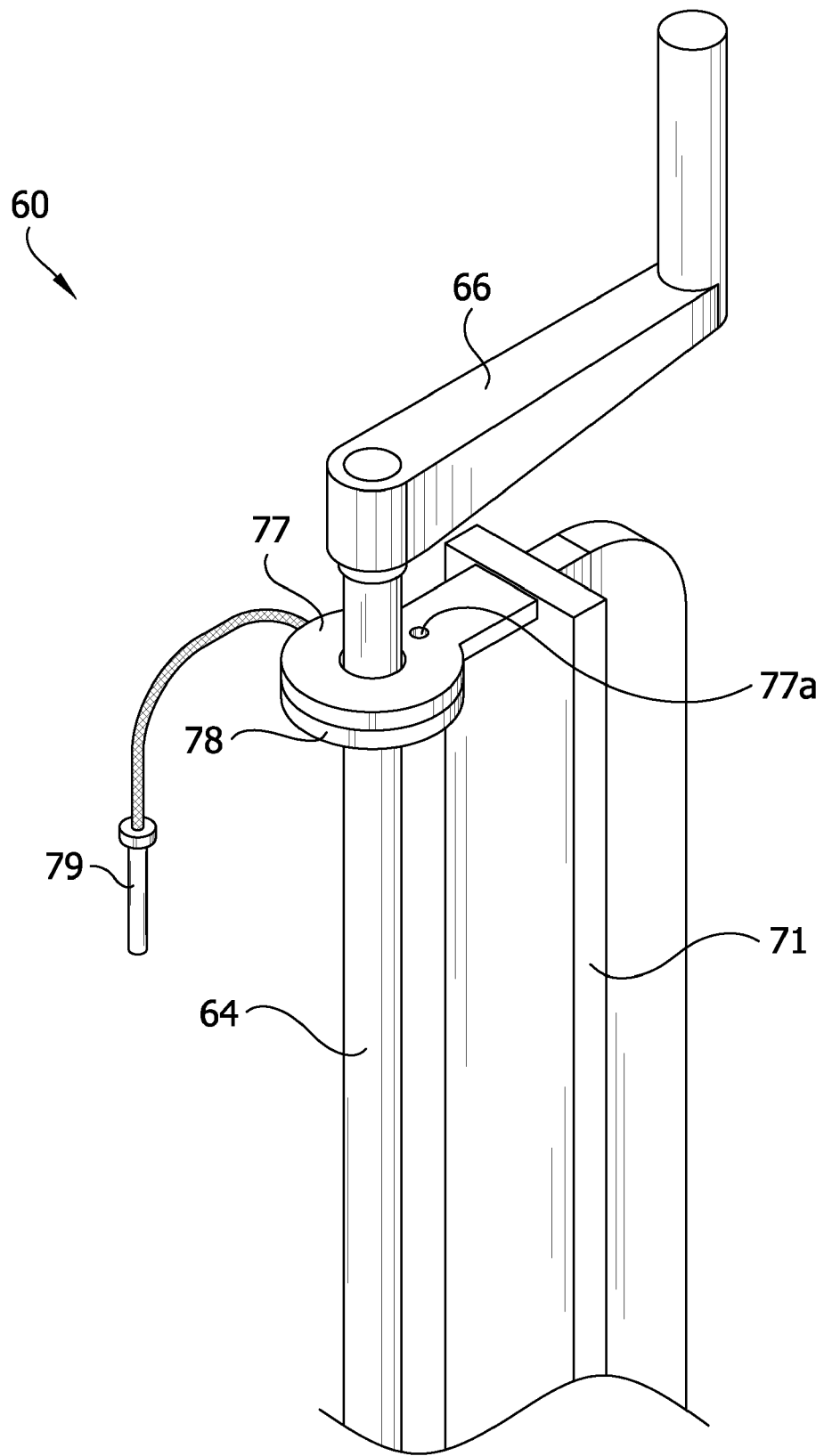
FIG. 5A is an enlarged, fragmentary perspective of an upper portion of a hand crank of the slider assembly.
Figure 5B:
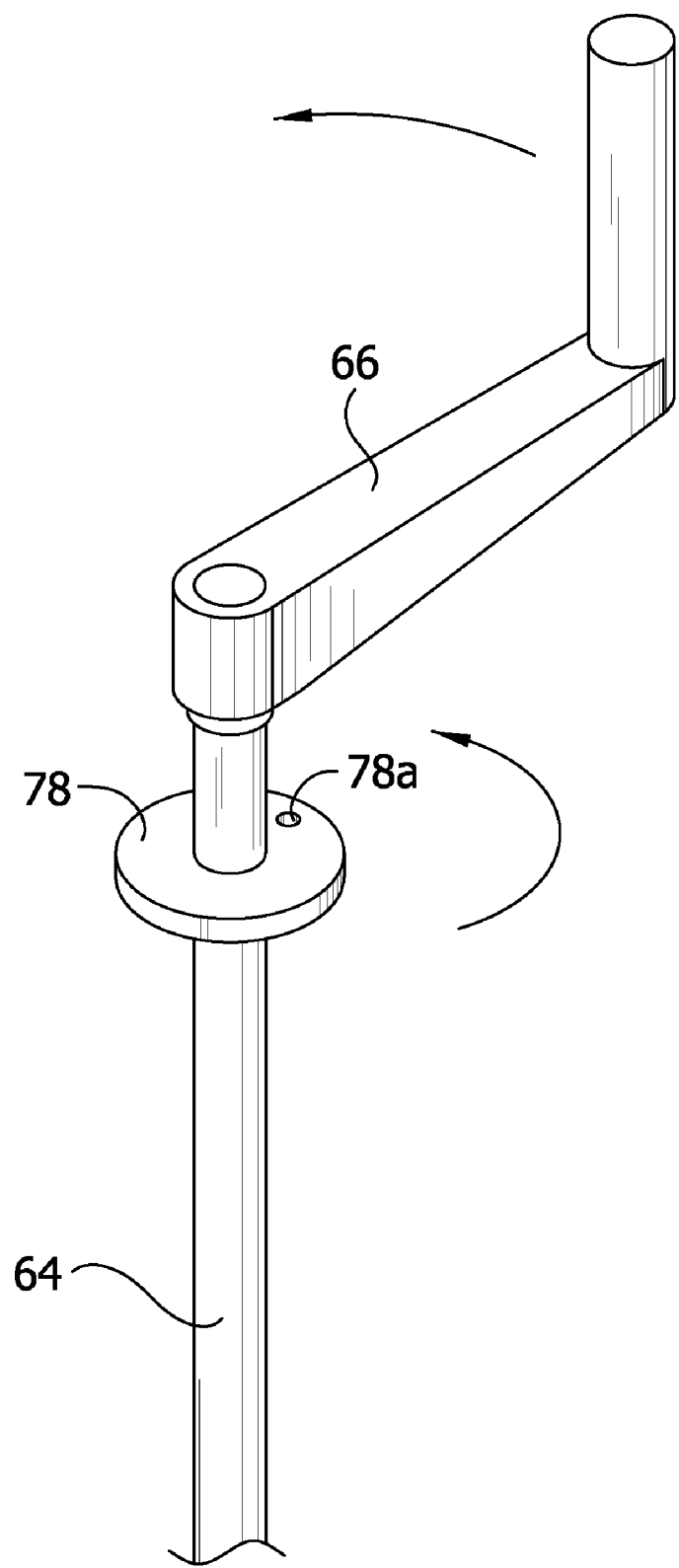
FIG. 5B is an enlarged, fragmentary perspective of the hand crank similar to FIG. 5A but with a support bracket removed.

Referring to FIGS. 5A and 5B, the rod 64 of the hand crank 60 extends through a central opening in a support plate 77 that extends laterally outward from an upper portion of the vertical bracket 71. The rod 64 is not secured to the support plate 77, and the rod axially rotates relative to the plate. The support plate 77 includes a locking opening 77a for reasons explained below. A locking plate 78 below the support plate 77 is secured to the rod 64. The locking plate 78 rotates coaxially with the rod 64 and relative to the support plate 77. The locking plate 78 includes a locking opening 78a (FIG. 5B) that is vertically alignable with the locking opening 77a in the support when the rod 64 and the locking plate are rotated to a locking position. It is understood that the locking opening 78a may comprise a radial slot or cavity or notch other opening within the scope of the present invention. When the respective locking openings 77a, 78a are aligned in the locking position, a locking pin 79 can be inserted axially through the aligned openings to inhibit rotational movement of the locking plate 78 and the rod 64 relative to the support plate 77. Consequently, when the rod 64 is locked, the driving mechanism 16 is also locked and linear movement of the platform 12 is precluded. In the illustrated embodiment, the locking pin 79 is tethered to the support plate 77, although it may be secured to the slider assembly 10 at other locations or may not be secured to the slider assembly. Other ways of locking the driving mechanism 16 and/or preventing linear movement of the platform 12 is within the scope of the present invention.

Referring to FIGS. 6-9, an ATM housing is generally indicated at 80. As will be appreciate by one having ordinary skill in the art, the slider assembly 10 is modular and is capable of being installed in preexisting ATM housings 80. The slider assembly 10 is installed in the ATM housing 80 and an ATM 81 is supported by the slider assembly. The ATM housing 80 includes framework providing structural support to the housing. The framework includes wall studs 82 and floor and ceiling frame members, 84, 86, respectively. The studs 82 and the floor and ceiling frame members 84, 86 may be formed from metal having generally rectangular cross sections. Wall, floor and ceiling panels 88, 90, 92, respectively, are secured to the wall studs 82, the floor frame members 84 and the ceiling frame members 86, respectively, to form an enclosed structure housing the ATM. The floor frame members 84 rest on and/or are secured to a subfloor 92 (FIGS. 7 and 9), which may include a slab of concrete, the ground or another structure. An opening 94 is formed in a front wall of the ATM housing 80 to allow a front of the ATM to be accessible to users during normal operations.

Figure 7:
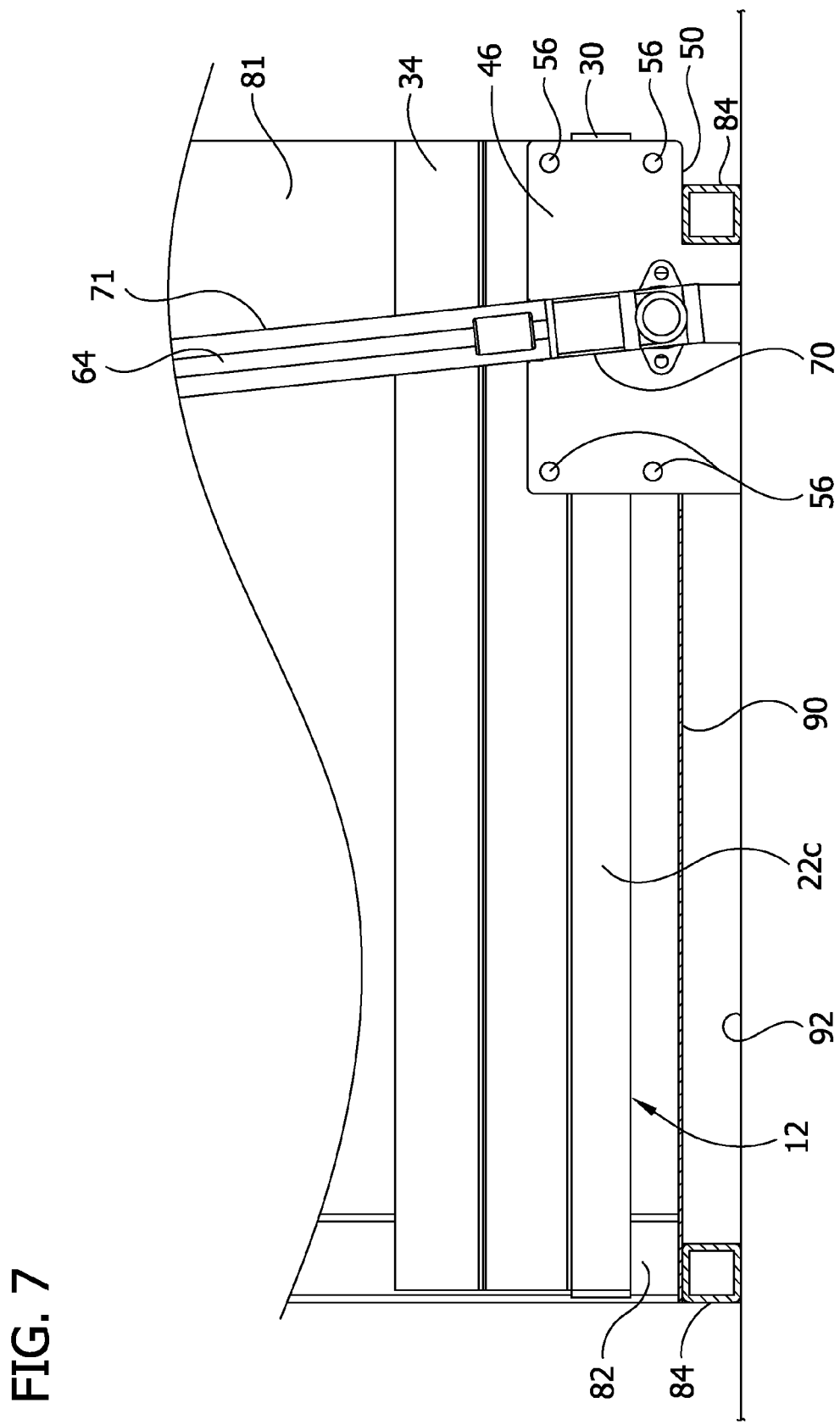
FIG. 7 is an enlarged, fragmentary section taken in a plane including line 7-7 in FIG. 6.
Figure 8:
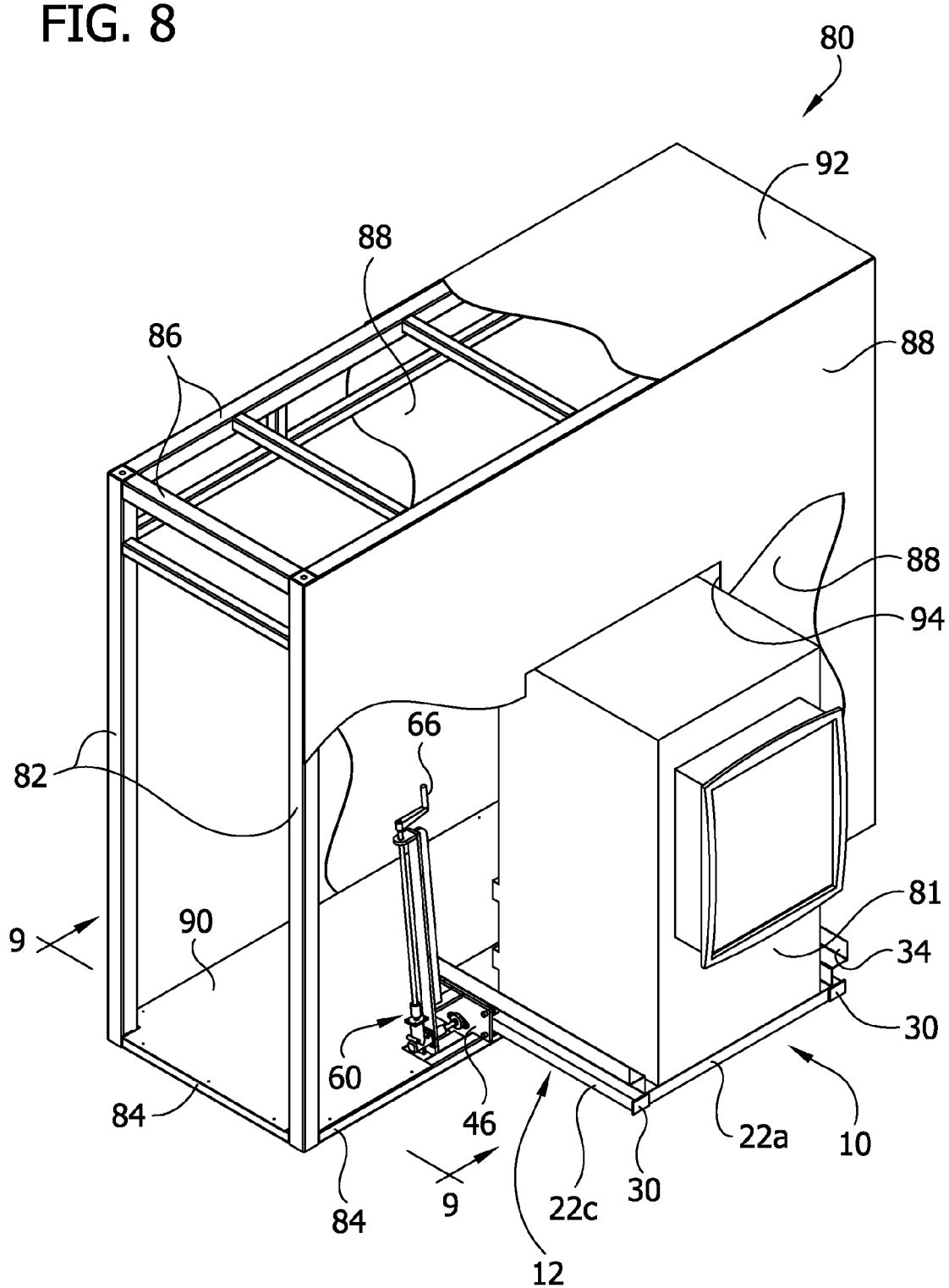
FIG. 8 is the perspective of FIG. 6 but with the ATM in an extended position.
Figure 9:
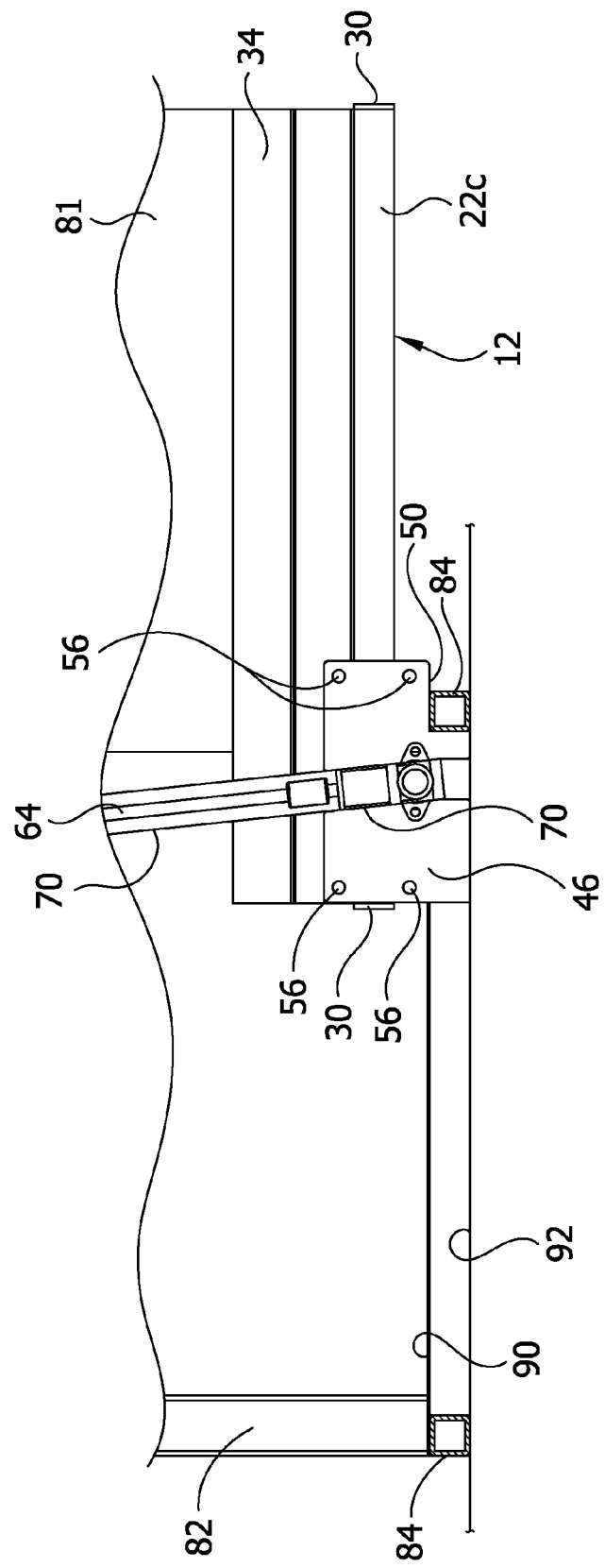
FIG. 9 is an enlarged, fragmentary section taken in a plane including line 9-9 in FIG. 8.

In use, the slider assembly 10 is used to move the ATM 81 out of the ATM housing 80 for servicing or other reasons and to move the ATM back into the housing after servicing. In the illustrated embodiment, the slider assembly 10 is installed in the ATM housing 80 by mounting the slider assembly on the floor frame member situated 84 adjacent to the front wall of the ATM housing so that the ATM is accessible through the opening 94 and so that the ATM may be extended out of the housing through the opening using the slider assembly. In the illustrated embodiment, an opening is formed in the floor panel 90 to install the base of the slider assembly. Referring to FIGS. 7 and 9, the cutouts 50 in the mounting plates 46 are sized and shaped so that the perimeter of the cutouts contact (e.g., generally abut) upper and rear surfaces of the floor frame members and bottom surfaces of the mounts contact (e.g., sit generally flush with) the subfloor 92. The mounting plates 46 are secured to the floor frame member 84, such as by welding the mounts to the frame member along the perimeter of the cutouts 50. The mounting plates 46 may be secured to the framework of the ATM housing 80 in other ways without departing from the scope of the present invention. The ATM 81 is secured to the tray 34, which is secured to the platform 12 to complete installation of the slider assembly 10. It is understood that other ways of installing the slider assembly 10 and the ATM 81 in the ATM housing 80 are within the scope of the present invention.

During normal operations, the platform 12 is in a retracted position (FIG. 6) where it and the ATM 81 are located within the ATM housing 80. Referring to FIGS. 6 and 7, in the retracted position, the rear end of the platform 12 is cantilevered from the mounting plates 46 and only the front end margin of the platform is engaged by the rollers 52a, 52b. Moreover, the platform 12 supported solely by the mounting plates 46 and so is spaced above and not in contact with the floor 90 of the ATM housing 80 (FIG. 7). For example and without being limiting, at least more than about one-fourth (¼) of the length of the platform 12 is located rearward from the mounting plates, more preferably at least more than about one-half (½) is located away from the mounting plates, and more preferably still at least more than about two-thirds (⅔) is located rearward from the mounting plates. In the retracted position, the driving mechanism 16 is locked to prevent the platform 12 and the ATM 81 from incidentally moving forward and out the ATM housing 80. In the illustrated embodiment, the locking pin 79 is received in the aligned locking openings 77a, 78a in the respective support and locking plates 77, 78, respectively.

To move the ATM 81 forward and out of the housing 80, the operator removes the locking pin 79 from the aligned locking openings 77a, 78a and turns the crank handle 66 of the hand crank 60 to impart axial rotation of the shaft 62 and the pinion gears 76. Axial rotation of the pinion gears 76 imparts linear movement of the platform 12 by way of the racks' 26 engagement with the pinion gears. The rollers 52a, 52b substantially continuously contact the respective side margins of the platform 12 and rotate as the platform moves linearly out of the ATM housing 80. The z-shapes of the side walls 38 of the tray 34 provide clearance for the upper rollers 52a so that the tray does not interfere with rollers. The operator continues to turn the crank handle 66 to move the ATM 81 out of the housing 80. When the platform 12 reaches its fully extended position, the stops 30 at the rear of the platform contact the mounting plates 46 and prevent the operator from accidentally over-extending the platform and disengaging the platform from the rollers 52a, 52b. In the extended position of the platform 12 (FIGS. 8 and 9), the front end of the platform is cantilevered from the mounting plates 46 and only the rear end margin of the platform is engaged by the rollers 52a, 52b. For example and without being limiting, at least more than about one-fourth (¼) of the length of the platform 12 is located forward from the mounting plates, more preferably at least more than about one-half (½) is located away from the mounting plates, and more preferably still at least more than about two-thirds (⅔) is located forward from the mounting plates.

After servicing the ATM 81, the operator retracts the platform 12 and the ATM (i.e., moves the platform rearward) by rotating the crank handle 66 of the hand crank 60 in the opposite direction to drive axial rotation of the shaft 62 and the pinion gears 76 in the opposite direction. The operator continues to rotate the handle 66 until the ATM 81 is back inside the housing 80 and the platform 12 is in its fully retracted position. The stops 30 at the front of the platform 12 contact the mounting plates 46 to prevent the operator from accidentally over-retracting the platform and disengaging the platform with the rollers 52a, 52b.

Having described the illustrated embodiment in detail, it will be apparent that modifications and variations are possible without departing from the scope of the invention defined in the appended claims.

When introducing elements of the present invention or the illustrated embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An automatic teller machine (ATM) housing comprising:
   a front wall having an opening;
   opposite side walls on either side of the front wall, the front wall and the side walls together at least partially define an interior of the ATM housing; and
   a slider assembly in the interior for moving an ATM into and out of the interior through the opening in the front wall, the slider assembly comprising:
   a driving mechanism;
   a first mount;
   a second mount spaced horizontally apart from the first mount;
   vertically spaced apart upper and lower first bearing structures extending outward from the first mount to partially define a first horizontal channel;
   vertically spaced apart upper and lower second bearing structures extending outward from the second mount to partially define a second horizontal channel;
   a platform for supporting the ATM, the platform having a front end, a rear end and opposite first and second side margins, the platform being operatively connected to the driving mechanism to impart generally linear forward and rearward movements of the platform relative to the first and second mounts between extended and retracted positions, the first side margin of the platform being received within the first horizontal channel between the upper and lower first bearing structures to support the platform and to facilitate the linear movement of the platform by the driving mechanism, the second side margin of the platform being received within the second horizontal channel between the upper and lower second bearing structures to support the platform and to facilitate the linear movement of the platform by the driving mechanism, wherein the platform and the first and second mounts are configured such that when the platform is in its extended position, only the rear end margin of the platform is engaged by the upper and lower first and second bearing structures and the front end margin is cantilevered from the first and second bearing structures and extends outside the interior through the opening in the front wall, and when the platform is in its refracted position, only the front end margin of the platform is engaged by the upper and lower first and second bearing structures and the rear end margin is cantilevered from the first and second bearing structures within the interior.

2. The automatic teller machine (ATM) housing set forth in claim 1 wherein each of the bearing structures comprises a roller rotatably mounted on the corresponding mount.

3. The automatic teller machine (ATM) housing set forth in claim 2 wherein each of the upper and lower rollers on the first mount is configured to be in continuous contact with the first side margin of the platform as the platform is moved linearly by the driving mechanism, and wherein each of the upper and lower rollers on the second mount is configured to be in continuous contact with the second side margin of the platform as the platform is moved linearly by the driving mechanism.

4. The automatic teller machine (ATM) housing set forth in claim 3 wherein there are two upper rollers and two lower rollers mounted on the first mount, and wherein there are two upper rollers and two lower rollers mounted on the second mount.

5. The automatic teller machine (ATM) housing set forth in claim 4 wherein the first mount comprises a first mounting plate and the second mount comprises a second mounting plate, the first and second mounting plates having inner faces generally opposing one another, wherein the respective upper and lower rollers extend outward from the inner faces of the respective first and second mounting plates.

6. The automatic teller machine (ATM) housing set forth in claim 1 wherein the platform includes a rack extending between the front and rear ends of the platform intermediate the first and second mounts, wherein the driving mechanism includes an axially rotatable shaft rotatably coupled to and extending between the first and second mounts, wherein the shaft includes a pinion gear axially coupled to the shaft intermediate the first and second mounts and having a plurality of teeth engaging the rack to drive linear forward and rearward movement of the platform.

7. The automatic teller machine (ATM) housing set forth in claim 6 wherein the rack comprises a plurality of racks and wherein the pinion gear includes a plurality of pinion gears, each pinion gear engaging a respective one of the racks.

8. The automatic teller machine (ATM) housing set forth in claim 6 wherein the driving mechanism includes a hand crank operatively coupled to the shaft to drive axial rotation of the shaft.

9. The automatic teller machine (ATM) housing set forth in claim 8 wherein the hand crank includes a rod configured for axial rotation to drive the shaft, wherein the driving mechanism further includes a locking mechanism for selectively precluding axial rotation of the rod.

10. The automatic teller machine (ATM) housing set forth in claim 1 wherein each of the mounts has a cutout at a lower portion of the mount engaging a floor frame member of the ATM housing to secure the slider assembly to the ATM housing.

11. The automatic teller machine (ATM) housing set forth in claim 1 further comprising:
a generally planar subfloor;
and an elongate floor frame member extending between the side walls,
wherein each of the mounts of the slider assembly has a generally planar bottom surface and a cutout extending upward from the bottom surface, the bottom surface of each mount contacting the subfloor, at least a portion of a perimeter of the cutout contacting the floor frame member.

12. The automatic teller machine (ATM) housing set forth in claim 1 wherein the slider assembly further comprises a stop extending laterally outward from the platform generally adjacent to the rear end of the platform to limit forward movement of the platform.

13. The automatic teller machine (ATM) housing set forth in claim 12 wherein the slider assembly further comprises stop extending laterally outward from the platform generally adjacent to the front end of the platform to limit rearward movement of the platform.

14. The automatic teller machine (ATM) housing set forth in claim 1, wherein the slider assembly further comprises:
first and second racks spaced apart horizontally on the platform and extending between the front and rear ends of the platform, the first and second racks being between the first and second mounts; and
first and second pinions operatively connected to the driving mechanism for selective rotation about a rotational axis, wherein the first pinion is engaged with the first rack and the second pinion is engaged with the second rack, wherein the rotational axis of the first and second pinions is disposed below the first and second horizontal channels.

15. The automatic teller machine (ATM) housing set forth in claim 14, further comprising a shaft operatively coupled to the first and second pinions for rotating the first and second pinions about the rotational axis, wherein the shaft is disposed below the first and second horizontal channels.

16. The automatic teller machine (ATM) housing set forth in claim 1, wherein the platform and the first and second mounts are configured so that at least more than about one-half of a length of the platform is located forward from the first and second mounts when the platform is in its extended position, and at least more than about one-half of the length of the platform is located rearward from the first and second mounts when the platform is in its retracted position.

17. A slider assembly for moving an ATM into and out of an ATM housing comprising:
a driving mechanism;
a mount;
a platform for supporting the ATM, the platform having front and rear end margins and opposite side margins, the platform being operatively connected to said driving mechanism to impart generally linear movement of the platform between an extended position and a retracted position, the platform being mounted on the mount so that when the platform is in its extended position, the rear end margin is supported by the mount and the front end margin is cantilevered, and when the platform is in its refracted position, the front end margin is supported by the mount and the rear end margin is cantilevered.

18. A slider assembly as set forth in claim 17 wherein the mount includes vertically spaced upper and lower bearing structures defining a horizontal channel, one of the side margins of the platform being received in the horizontal channel.

19. A slider assembly as set forth in claim 18 wherein the upper and lower bearing structures are rotatably mounted on the mount.

20. A slider assembly as set forth in claim 17 further comprising vertically spaced apart upper and lower bearing structures extending outward from the mount to partially define a horizontal channel having a length, wherein the platform has a length extending from the front end margin to the rear end margin, wherein the length of the horizontal channel is less than one-half the length of the platform.

21. A slider assembly for moving an ATM into and out of an ATM housing comprising:
   a driving mechanism;
   a mount;
   vertically spaced apart upper and lower bearing structures extending outward from the mount to partially define a horizontal channel;
   a platform for supporting the ATM, the platform having a front end, a rear end and opposite first and second side margins, the platform being operatively connected to the driving mechanism to impart generally linear forward and rearward movements of the platform relative to the mount between extended and retracted positions, the first side margin being received within the horizontal channel between the upper and lower bearing structures to support the platform and to facilitate the linear movement of the platform by the driving mechanism,
   wherein the mount has a cutout at a lower portion of the mount sized and shaped to engage a frame member of the ATM housing to secure the slider assembly to the ATM housing.

22. A slider assembly as set forth in claim 21 in combination with the ATM housing, the ATM housing comprising:
   a front wall;
   an opening in the front wall;
   opposite side walls on either side of the front wall;
   a generally planar subfloor;
   and an elongate floor frame member extending between the side walls,
   wherein the mount has a generally planar bottom surface and the cutout extends upward from the bottom surface,
   wherein the bottom surface of the mount contacts the subfloor in the housing, and at least a portion of a perimeter of the cutout contacts the floor frame member.

23. A slider assembly as set forth in claim 21 in combination with the ATM housing, the ATM housing comprising:
   a front wall;
   an opening in the front wall; and
   opposite side walls on either side of the front wall, wherein the front wall and the side walls at least partially define an interior of the ATM housing,
   wherein the mount of the slider assembly is secured to the ATM housing and disposed in the interior of the ATM housing such that the platform extends out from the opening in the front wall in its extended position.

24. A slider assembly for moving an ATM into and out of an ATM housing comprising:
   a driving mechanism;
   a first mount;
   a second mount spaced horizontally apart from the first mount;
   vertically spaced apart upper and lower first bearing structures extending outward from the first mount to partially define a first horizontal channel;
   vertically spaced apart upper and lower second bearing structures extending outward from the second mount to partially define a second horizontal channel;
   a platform for supporting the ATM, the platform having a front end, a rear end and opposite first and second side margins, the platform being operatively connected to the driving mechanism to impart generally linear forward and rearward movements of the platform relative to the first and second mounts between extended and refracted positions, the first side margin of the platform being received within the first horizontal channel between the upper and lower first bearing structures to support the platform and to facilitate the linear movement of the platform by the driving mechanism, the second side margin of the platform being received within the second horizontal channel between the upper and lower second bearing structures to support the platform and to facilitate the linear movement of the platform by the driving mechanism;
   first and second racks secured to the platform, the racks being spaced apart horizontally on the platform and extending between the front and rear ends of the platform, the first and second racks disposed between the first and second mounts; and
   first and second pinions operatively connected to the driving mechanism for selective rotation about a rotational axis, wherein the first pinion is engaged with the first rack and the second pinion is engaged with the second rack to impart generally linear forward and rearward movements of the platform relative to the first and second mounts between extended and retracted positions, wherein the rotational axis of the first and second pinions is below the first and second horizontal channels.

* * * * *